(12) United States Patent
Suzuki et al.

(10) Patent No.: US 8,742,983 B2
(45) Date of Patent: Jun. 3, 2014

(54) RADAR RECEPTION SIGNAL PROCESSING APPARATUS AND METHOD THEREOF

(75) Inventors: Junichiro Suzuki, Hino (JP); Toshiyuki Miyazaki, Kawasaki (JP); Mitsuyoshi Shinonaga, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 377 days.

(21) Appl. No.: 13/338,641

(22) Filed: Dec. 28, 2011

(65) Prior Publication Data

US 2012/0256787 A1 Oct. 11, 2012

(30) Foreign Application Priority Data

Apr. 6, 2011 (JP) .................................. 2011-084528

(51) Int. Cl.
*G01S 13/00* (2006.01)

(52) U.S. Cl.
USPC .......................................... 342/189; 342/192

(58) Field of Classification Search
USPC ........................................... 342/159, 189, 192
See application file for complete search history.

(56) References Cited

U.S. PATENT DOCUMENTS

| 5,510,796 | A  | * | 4/1996 | Applebaum  ................. | 342/162 |
| 7,561,100 | B2 |   | 7/2009 | Shinonaga |  |
| 2003/0117314 | A1 | * | 6/2003 | Yu ................................ | 342/162 |

FOREIGN PATENT DOCUMENTS

JP 2009-229104 10/2009

OTHER PUBLICATIONS

J. R. Guerci, "Space-Time Adaptive Processing for Radar", Artech House, 2003, 4 pages.

* cited by examiner

*Primary Examiner* — Timothy A Brainard
(74) *Attorney, Agent, or Firm* — Oblon, Spivak, McClelland, Maier & Neustadt, L.L.P.

(57) ABSTRACT

According to one embodiment, a calculating of a weight includes which is calculating a covariance matrix by applying a process (Post-Doppler process) of selecting a plurality of banks after execution of a Doppler filter process to a specified number of pulses of the received signal, and extracting a plurality of arbitrary bank parts from among the plurality of selected banks which are used for the calculation of the covariance matrix, and calculating a plurality of weights on a phase and an amplitude, from a matrix of the plurality of extracted bank parts.

20 Claims, 5 Drawing Sheets

US 8,742,983 B2

RADAR RECEPTION SIGNAL PROCESSING APPARATUS AND METHOD THEREOF

CROSS-REFERENCE TO RELATED APPLICATIONS

This application is based upon and claims the benefit of priority from prior Japanese Patent Application No. 2011-084528, filed Apr. 6, 2011, the entire content of which are incorporated herein by reference.

FIELD

Embodiments described herein relate generally to a weight calculation method which is suitable for detecting a reflective signal from a target by suppressing an undesired wave by weight control, a weight calculation unit using the weight calculation method, an adaptive array antenna which adopts the weight calculation unit, and a radar apparatus in which the adaptive array antenna is assembled.

BACKGROUND

In recent years, in a pulse radar apparatus, in order to further improve a target detection precision, an adaptive array antenna is incorporated, and so-called adaptive null steering is performed. The adaptive null steering is a process of applying weight control to a phase and an amplitude of a reception signal in the adaptive array antenna, thereby forming a reception synthetic beam such that the directivity in a direction in which an undesired wave comes in may become zero (null). In the adaptive array antenna which is used for this purpose, it is required to execute weight control so that the formation of the above-described reception synthetic signal can be properly performed even in an environment in which many delay signals are coming, or in an environment in which a clutter or an undesired wave is present.

This being the case, in the adaptive array antenna, attention has been paid to a weight control method in which Space Time Adaptive Processing (STAP) is adopted. The Space Time Adaptive Processing (STAP) is characterized in that SINR (Signal to Interference plus Noise Ratio) can be improved, and beam formation, in which the directivity in a direction in which an undesired wave comes is close to zero (null), can be performed.

In the Space Time Adaptive Processing (STAP), the following process is performed. To begin with, a target reflective signal is received by a plurality (N) of antennas (elemental antennas, i.e. channels) which are arranged in an array. The received signal is stored at a corresponding cell position of all process range cells, which are formed such that range cells with a width corresponding to a reception pulse width are formed to be continuous with a predetermined length on a time axis. Then, a covariance matrix is calculated from the data of range cells, which are obtained by excluding, from the stored data, range cells (also referred to as "process-adaptive range cell") which presumably include a target signal, or in other words, from the data of range cells which are presumably formed of an undesired wave alone. At last, in a beam synthesis circuit, weight control is applied to the antenna reception signal by using an adaptive weight which has been calculated based on the covariance matrix.

In the weight control in this space time adaptive processing method, a weight calculation for each range cell is performed in the weight calculation circuit. Instead of a full-DOF (degrees-of-freedom) method which calculates a weight by using all reception pulses, there are known a pre-Doppler process which makes applicable use of the concept of DPCA (displaced phase center antenna) which reduces the size (the number of orders) of the matrix in order to decrease the processing time of the weight calculation, a Post-Doppler process which performs a weight calculation after selecting m banks which have been subjected to a Doppler filtering process, a beamspace process which performs a weight calculation after the execution of a beamspace process, and a beamspace Post-Doppler process in which these processes are combined. However, in these processes, there occurs a region of a speed, in which the performance relating to a target Doppler frequency deteriorates, and it is difficult to obtain a good SINR characteristic.

As has been described above, in the space time adaptive processing by the weight control of the adaptive array antenna which is used in the conventional radar apparatus, when the Post-Doppler process is applied to the weight calculation for reducing the directivity in the direction of the undesired wave to null, there occurs the region of speed in which the performance relating to the target Doppler frequency deteriorates. Thus, it has been difficult to obtain good SINR characteristics.

DETAILED DESCRIPTION

In general, according to one embodiment, a weight calculation method comprising: storing a target reflective signal of a radar pulse, which is received via an antenna, at a corresponding cell position according to a reception timing on a plurality of process range cells with a length corresponding to a predetermined distance on a time axis; and calculating a weight on a phase and an amplitude of the received signal, for forming a reception synthesis beam in a manner to reduce directivity in an incoming direction of an undesired wave to null, relative to an incoming direction of the target reflective signal, with use of values stored in the plurality of process range cells, wherein the calculating of the weight includes:

calculating a covariance matrix by applying a process (Post-Doppler process) of selecting a plurality of banks after execution of a Doppler filter process to a specified number of pulses of the received signal; and extracting a plurality of arbitrary bank parts from among the plurality of selected banks which are used for the calculation of the covariance matrix, and calculating a plurality of weights on the phase and the amplitude, from a matrix of the plurality of extracted bank parts.

An embodiment will now be described with reference to the accompanying drawings.

To begin with, a Post-Doppler process is described as a method of the above-described weight calculation.

Figure 1:
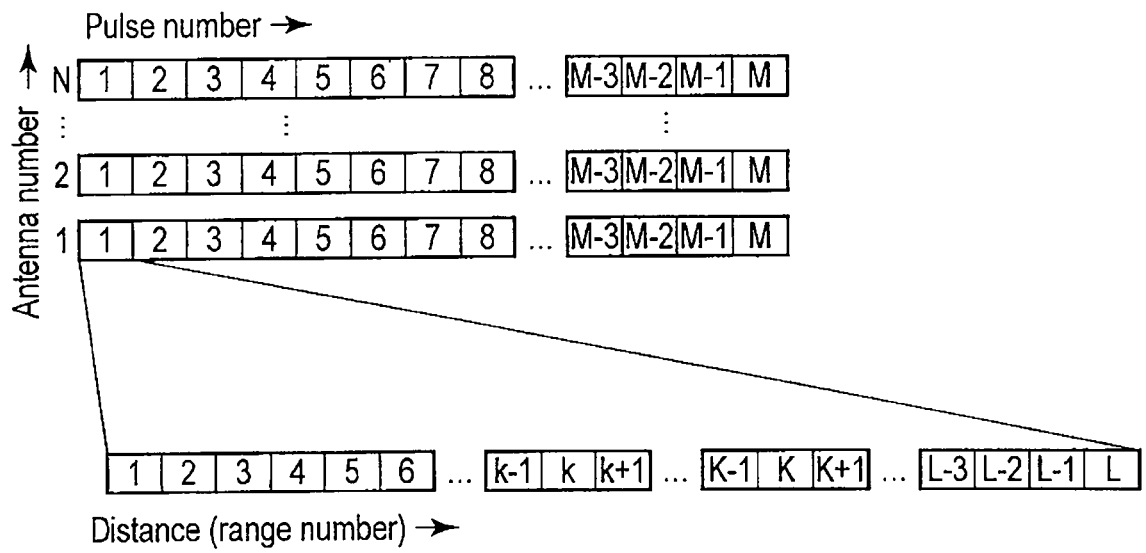
FIG. 1 is a conceptual view of received data in an embodiment.
Figure 2:
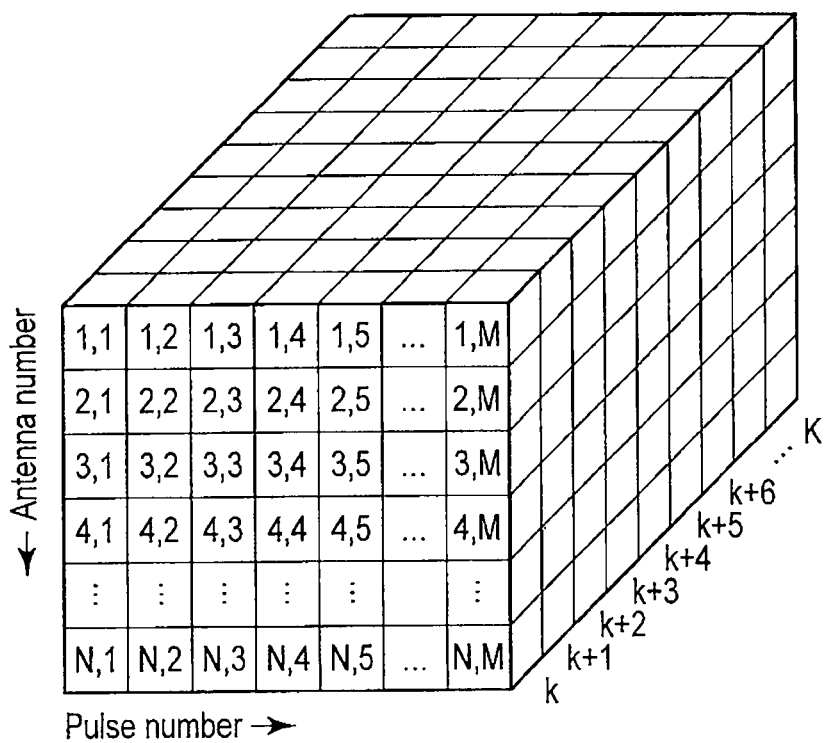
FIG. 2 is a conceptual view of data which is used in weight calculation in the embodiment.
Figure 3:
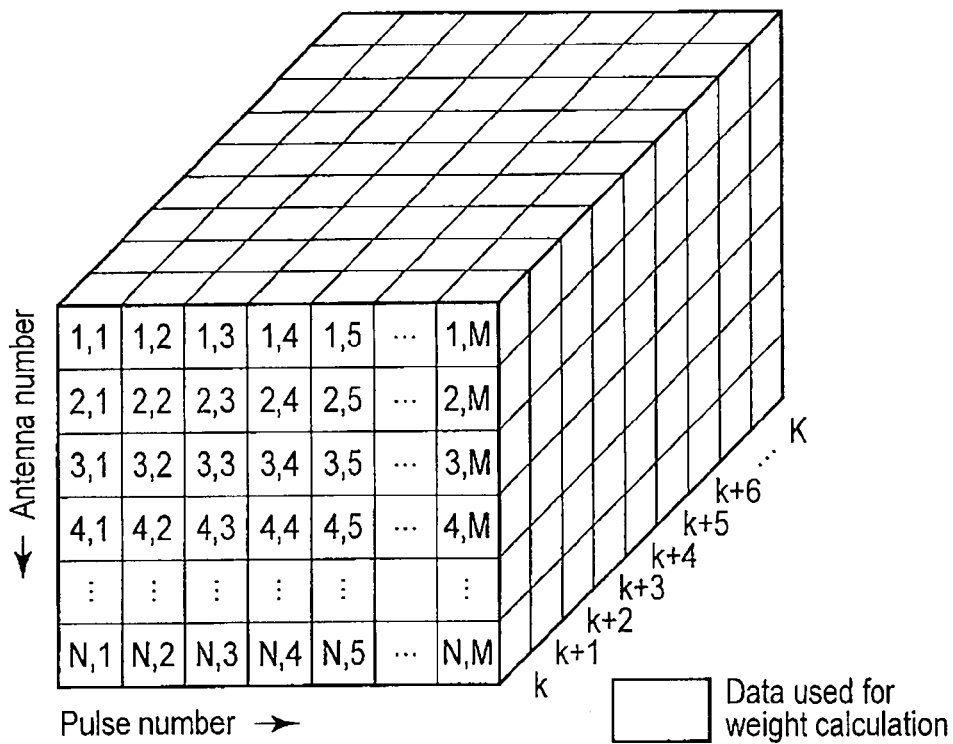
FIG. 3 is a conceptual view in which all reception pulses are used for the weight calculation in the embodiment.

FIG. 1 is a conceptual view of received data in the case of an antenna number N, a reception pulse number M and a distance (range number) L. FIG. 2 is a conceptual view of data which is used in weight calculation. FIG. 3 is a conceptual view in a case where all reception pulses are used for the weight calculation in the embodiment.

When the direction matrix of an incoming direction of a reception signal X is A, a complex amplitude vector is S, and thermal noise, which is given by a mean 0 and a variance $\sigma^2$, is n, the reception signal X is expressed by the following equation (1):

$$X = A \cdot S + n \tag{1}$$

When a target signal has been received by an N-number of antennas #n (n: 1~N) which are arranged in an array with a distance dx, the wavelength of the reception frequency signal is $\lambda(\Lambda)$, and a steering vector $a(\theta d)$, which determines a direction of incoming of a D-number of target signals d (d: 1~D), is expressed by the following equation (2):

$$a(\theta_d) = \begin{bmatrix} \exp\left(j\frac{2\pi}{\lambda} dx \cdot 0 \cdot \sin\theta_d\right) \\ \exp\left(j\frac{2\pi}{\lambda} dx \cdot 1 \cdot \sin\theta_d\right) \\ \vdots \\ \exp\left(j\frac{2\pi}{\lambda} dx \cdot (m-1) \cdot \sin\theta_d\right) \end{bmatrix} \tag{2}$$

In this case, an angular direction, that is, a direction matrix $A\theta$ in relation to a spatial series, is expressed by the following equation (3):

$$A_\theta = [a(\theta_1), a(\theta_2), \ldots, a(\theta_D)] \tag{3}$$

Further, if the Doppler frequency of the target signal d is fd, and the interval of an M number of reception pulses is T, the steering vector a(fd) in the time direction is expressed by the following equation (4):

$$a(f_d) = \begin{bmatrix} \exp\left(j2\pi \cdot \frac{0}{T} \cdot f_d\right) \\ \exp\left(j2\pi \cdot \frac{1}{T} \cdot f_d\right) \\ \vdots \\ \exp\left(j2\pi \cdot \frac{(l-1)}{T} \cdot f_d\right) \end{bmatrix} \tag{4}$$

From the above, the direction matrix Af of the time series, in relation to all reception pulses, is expressed by the following equation (4):

$$A_f = [a(f_1), a(f_2), \ldots, a(f_D)] \tag{5}$$

Hence, using a space time steering vector $a(\theta d, fd)$ expressed by the following equation (6), $$a(\theta_d, f_d) = \begin{bmatrix} \exp\left(j2\pi \cdot \frac{0}{T} \cdot f_d\right) \cdot a(\theta_d) \\ \exp\left(j2\pi \cdot \frac{1}{T} \cdot f_d\right) \cdot a(\theta_d) \\ \vdots \\ \exp\left(j2\pi \cdot \frac{(l-1)}{T} \cdot f_d\right) \cdot a(\theta_d) \end{bmatrix} \tag{6}$$

the direction matrix A(0, f) is given by the following equation (7):

$$A_{\theta,f} = [a(\theta_1, f_1), a(\theta_2, f_2), \ldots, a(\theta_D, f_D)] \tag{7}$$

The Post-Doppler process is a process of executing a weight calculation after applying a Doppler filter process to received data of M pulses. Specifically, a transformed vector $f_{m,l}$ of an (M×1) order, which outputs a bank #l (1:0, 1, ..., M−1), is defined by the following equation (8):

$$f_{m,l} = \exp\left(j \cdot 2\pi \cdot \frac{(m-1) \cdot l}{M}\right) m:1, \ldots, M \tag{8}$$

In the case of N elements, it is necessary to apply a Doppler filter process to each element. Thus, by using a unit matrix $I_{N \times N}$ of an (N×N) order, extension is made to a transformed matrix $\Omega_l$ of an (N×NM) order shown below:

$$\Omega_l = f_{m,l}^H \otimes I_{N \times N} \tag{9}$$

$$= \begin{bmatrix} f_{1,l}^* & 0 & \cdots & 0 & f_{2,l}^* & 0 & \cdots & 0 & & f_{M,l}^* & 0 & \cdots & 0 \\ 0 & f_{1,l}^* & & \vdots & 0 & f_{2,l}^* & & \vdots & \cdots & 0 & f_{M,l}^* & & \vdots \\ \vdots & & \ddots & 0 & \vdots & & \ddots & 0 & & \vdots & & \ddots & 0 \\ 0 & \cdots & 0 & f_{1,l}^* & 0 & \cdots & 0 & f_{2,l}^* & & 0 & \cdots & 0 & f_{M,l}^* \end{bmatrix}$$

where $\otimes$ indicates a Kronecker product, and * indicates a complex conjugate.

This transformed matrix $\Omega_1$ is made into a multi-bin in order to enhance performance. Specifically, a method (hereinafter referred to as "multi-bin Post-Doppler") is adopted for calculating a covariance matrix by using a transformed matrix $\Omega$ in which a transformed matrix $\Omega_l$ from plural banks is coupled in the row direction.

For example, the transformed matrix $\Omega$ of an (6N×NM) order in 6-bin Post-Doppler (i.e. extraction of 6 banks) is defined as follows:

$$\Omega = \begin{bmatrix} \Omega_l \\ \Omega_{l+1} \\ \Omega_{l+2} \\ \Omega_{l+3} \\ \Omega_{l+4} \\ \Omega_{l+5} \end{bmatrix}$$

$$= \begin{bmatrix}
f_{1,l}^* & 0 & \cdots & 0 & f_{2,l}^* & 0 & \cdots & 0 & & f_{M,l}^* & 0 & \cdots & 0 \\
0 & f_{1,l}^* & & \vdots & 0 & f_{2,l}^* & & \vdots & & 0 & f_{M,l}^* & & \vdots \\
\vdots & & \ddots & 0 & \vdots & & \ddots & 0 & & \vdots & & \ddots & 0 \\
0 & & 0 & f_{1,l}^* & 0 & \cdots & 0 & f_{2,l}^* & & 0 & \cdots & 0 & f_{M,l}^* \\
f_{1,l+1}^* & 0 & \cdots & 0 & f_{2,l+1}^* & 0 & \cdots & 0 & & f_{M,l+1}^* & 0 & \cdots & 0 \\
0 & f_{1,l+1}^* & & \vdots & 0 & f_{2,l+1}^* & & \vdots & \cdots & 0 & f_{M,l+1}^* & & \vdots \\
\vdots & & \ddots & 0 & \vdots & & \ddots & 0 & & \vdots & & \ddots & 0 \\
0 & \cdots & 0 & f_{1,l+1}^* & 0 & \cdots & 0 & f_{2,l+1}^* & & 0 & \cdots & 0 & f_{M,l+1}^* \\
f_{1,l+2}^* & 0 & \cdots & 0 & f_{2,l+2}^* & 0 & \cdots & 0 & & f_{M,l+2}^* & 0 & \cdots & 0 \\
0 & f_{1,l+2}^* & & \vdots & 0 & f_{2,l+2}^* & & \vdots & & 0 & f_{M,l+2}^* & & \vdots \\
\vdots & & \ddots & 0 & \vdots & & \ddots & 0 & & \vdots & & \ddots & 0 \\
0 & \cdots & 0 & f_{1,l+2}^* & 0 & \cdots & 0 & f_{2,l+2}^* & & 0 & \cdots & 0 & f_{M,l+2}^* \\
f_{1,l+3}^* & 0 & \cdots & 0 & f_{2,l+3}^* & 0 & \cdots & 0 & & f_{M,l+3}^* & 0 & \cdots & 0 \\
0 & f_{1,l+3}^* & & \vdots & 0 & f_{2,l+3}^* & & \vdots & & 0 & f_{M,l+3}^* & & \vdots \\
\vdots & & \ddots & 0 & \vdots & & \ddots & 0 & & \vdots & & \ddots & 0 \\
0 & & 0 & f_{1,l+3}^* & 0 & \cdots & 0 & f_{2,l+3}^* & & 0 & \cdots & 0 & f_{M,l+3}^* \\
f_{1,l+4}^* & 0 & \cdots & 0 & f_{2,l+4}^* & 0 & \cdots & 0 & & f_{M,l+4}^* & 0 & \cdots & 0 \\
0 & f_{1,l+4}^* & & \vdots & 0 & f_{2,l+4}^* & & \vdots & \cdots & 0 & f_{M,l+4}^* & & \vdots \\
\vdots & & \ddots & 0 & \vdots & & \ddots & 0 & & \vdots & & \ddots & 0 \\
0 & \cdots & 0 & f_{1,l+4}^* & 0 & \cdots & 0 & f_{2,l+4}^* & & 0 & \cdots & 0 & f_{M,l+4}^* \\
f_{1,l+5}^* & 0 & \cdots & 0 & f_{2,l+5}^* & 0 & \cdots & 0 & & f_{M,l+5}^* & 0 & \cdots & 0 \\
0 & f_{1,l+5}^* & & \vdots & 0 & f_{2,l+5}^* & & \vdots & & 0 & f_{M,l+5}^* & & \vdots \\
\vdots & & \ddots & 0 & \vdots & & \ddots & 0 & & \vdots & & \ddots & 0 \\
0 & \cdots & 0 & f_{1,l+5}^* & 0 & \cdots & 0 & f_{2,l+5}^* & & 0 & \cdots & 0 & f_{M,l+5}^*
\end{bmatrix} \quad (10)$$

If the input vector of an (NM×1) order at time point k is X, (6N×1) order input vector $X_{\Omega k}$ and steering vector $S_{\Omega k}$ after transform are defined as follows by using the transformed vector $\Omega$:

$$x_{\Omega k} = \Omega \cdot X$$

$$s_{\Omega k} = \Omega \cdot S \quad (11)$$

Further, calculation of covariance matrix $R_k$ is executed as follows by using the input vector $X_{\Omega k}$ after transform:

$$R_k = \frac{1}{K-k+1} \sum_{n=k}^{K} x_{\Omega_k} \cdot x_{\Omega_k}^H \quad (12)$$

For example, a weight W in the case of using Wiener Filter in the weight calculation is calculated by using a steering vector $S_{\Omega k}$ by the following equation:

$$w = \frac{R_k^{-1} s_{\Omega_k}}{s_{\Omega_k}^H R_k^{-1} s_{\Omega_k}} \quad (13)$$

As the algorithm that is used for the weight calculation, use may be made of Principal Components, Cross Spectral Metric, Multistage Wiener Filer, or other algorithms.

Figure 4:
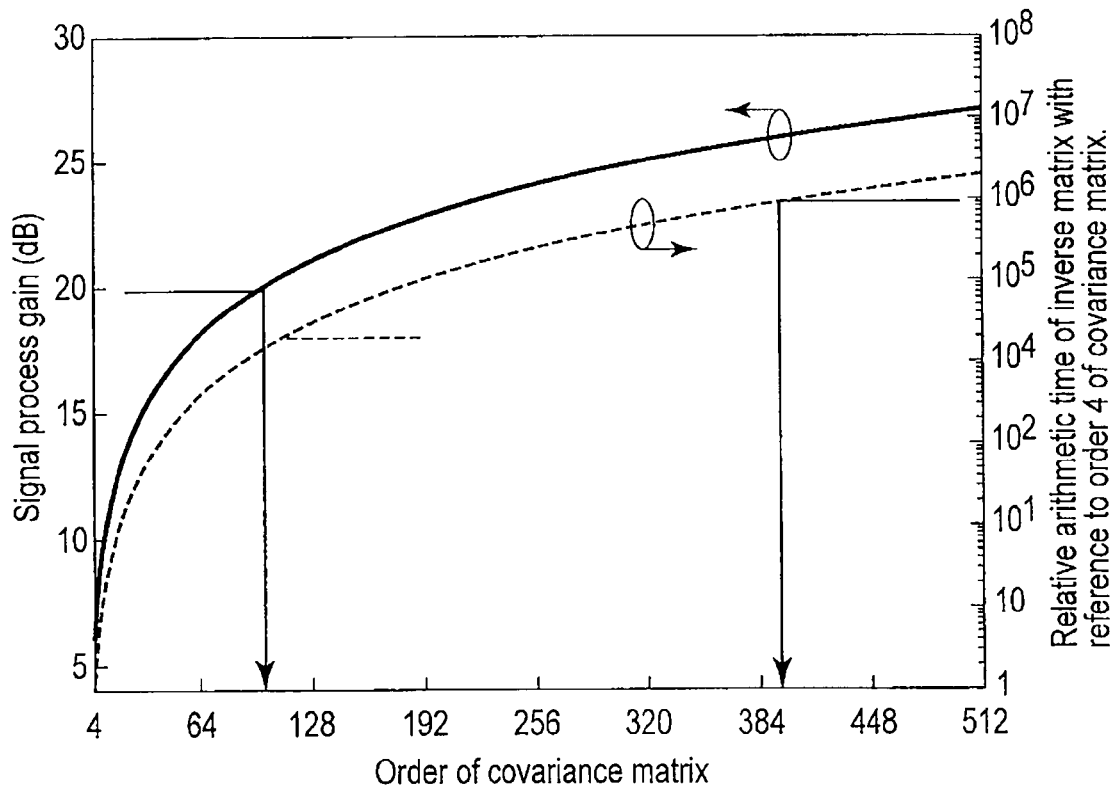
FIG. 4 is a characteristic graph showing the relationship between a signal process gain and a calculation time, versus the number of orders of a covariance matrix in the embodiment.

As has been described above, it is understood that inverse matrix arithmetic operations, which correspond to the order of the covariance matrix, are necessary for the calculation of weight, and that the time for arithmetic operations increases or decreases in accordance with the number of antenna elements and the number of reception pulses. FIG. 4 illustrates the relationship between a signal process gain and a calculation time, versus the number of orders of a covariance matrix.

In general, it is known that an inverse matrix calculation is proportional to about the third power of the number of orders. By decreasing the order of the covariance matrix, the calculation time for the weight calculation can be shortened. On the other hand, the signal process gain (performance) is, in general, equivalent to the addition process, and it is known that the signal process gain is proportional to the number of orders. It is understood that the signal process gain is improved in accordance with the increase in the number of orders.

Specifically, as is understood from FIG. 4, under the condition that the signal process gain is 20 dB or more and the calculation time is $10^6$ or less, the number of orders of the covariance matrix may be set at 384, for example, when priority is placed on the signal process gain, and may be set at 192 when priority is placed on the calculation time.

From the above, it is understood that since the number of orders of the matrix relates to the calculation time and signal process gain, it is necessary to design, according to the system, whether priority is placed on the calculation time or on the signal process gain.

Next, the weight calculation method according to the present embodiment is explained.

Figure 5:
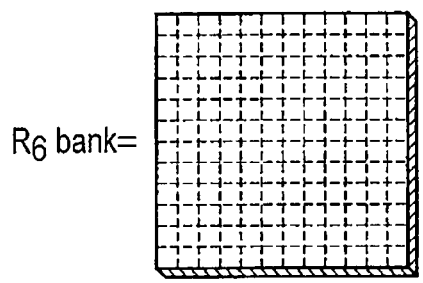
FIG. 5 is a conceptual view of the covariance matrix in the embodiment.

As shown in equations (10) to (12), as regards the covariance matrix in Post-Doppler, the size of the matrix is determined in accordance with the number of banks that are extracted. FIG. 5 is a conceptual view of the covariance matrix.

For example, when 5 banks are extracted, as shown in the following equation (14), it is understood that a lower-side N row (corresponding to the 6th bank) of the transformed matrix shown in equation (10) is needless:

$$\Omega = \begin{bmatrix} \Omega_l \\ \Omega_{l+1} \\ \Omega_{l+2} \\ \Omega_{l+3} \\ \Omega_{l+4} \end{bmatrix} \quad (14)$$

$$= \begin{bmatrix}
f^*_{1,l} & 0 & \cdots & 0 & f^*_{2,l} & 0 & \cdots & 0 & & f^*_{M,l} & 0 & \cdots & 0 \\
0 & f^*_{1,l} & \vdots & 0 & f^*_{2,l} & \vdots & & 0 & & f^*_{M,l} & & \vdots \\
\vdots & & \ddots & 0 & \vdots & & \ddots & 0 & & \vdots & & \ddots & 0 \\
0 & & 0 & f^*_{1,l} & 0 & \cdots & 0 & f^*_{2,l} & & 0 & \cdots & 0 & f^*_{M,l} \\
f^*_{1,l+1} & 0 & \cdots & 0 & f^*_{2,l+1} & 0 & \cdots & 0 & & f^*_{M,l+1} & 0 & \cdots & 0 \\
0 & f^*_{1,l+1} & \vdots & 0 & f^*_{2,l+1} & \vdots & \cdots & 0 & & f^*_{M,l+1} & & \vdots \\
\vdots & & \ddots & 0 & \vdots & & \ddots & 0 & & \vdots & & \ddots & 0 \\
0 & \cdots & 0 & f^*_{1,l+1} & 0 & \cdots & 0 & f^*_{2,l+1} & & 0 & \cdots & 0 & f^*_{M,l+1} \\
f^*_{1,l+2} & 0 & \cdots & 0 & f^*_{2,l+2} & 0 & \cdots & 0 & & f^*_{M,l+2} & 0 & \cdots & 0 \\
0 & f^*_{1,l+2} & \vdots & 0 & f^*_{2,l+2} & \vdots & & 0 & & f^*_{M,l+2} & & \vdots \\
\vdots & & \ddots & 0 & \vdots & & \ddots & 0 & & \vdots & & \ddots & 0 \\
0 & & 0 & f^*_{1,l+2} & 0 & \cdots & 0 & f^*_{2,l+2} & & 0 & \cdots & 0 & f^*_{M,l+2} \\
f^*_{1,l+3} & 0 & \cdots & 0 & f^*_{2,l+3} & 0 & \cdots & 0 & & f^*_{M,l+3} & 0 & \cdots & 0 \\
0 & f^*_{1,l+3} & \vdots & 0 & f^*_{2,l+3} & \vdots & & 0 & & f^*_{M,l+3} & & \vdots \\
\vdots & & \ddots & 0 & \vdots & & \ddots & 0 & & \vdots & & \ddots & 0 \\
0 & & 0 & f^*_{1,l+3} & 0 & \cdots & 0 & f^*_{2,l+3} & & 0 & \cdots & 0 & f^*_{M,l+3} \\
f^*_{1,l+4} & 0 & \cdots & 0 & f^*_{2,l+4} & 0 & \cdots & 0 & & f^*_{M,l+4} & 0 & \cdots & 0 \\
0 & f^*_{1,l+4} & \vdots & 0 & f^*_{2,l+4} & \vdots & \cdots & 0 & & f^*_{M,l+4} & & \vdots \\
\vdots & & \ddots & 0 & \vdots & & \ddots & 0 & & \vdots & & \ddots & 0 \\
0 & \cdots & 0 & f^*_{1,l+4} & 0 & \cdots & 0 & f^*_{2,l+4} & & 0 & \cdots & 0 & f^*_{M,l+4}
\end{bmatrix}$$

Figure 6:
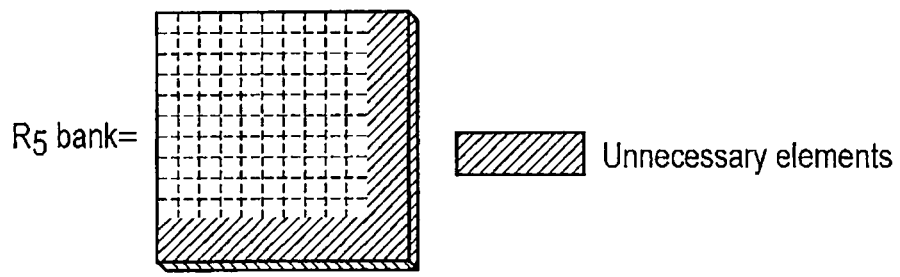
FIG. 6 is a conceptual view illustrating extraction of one bank from the covariance matrix of the embodiment shown in FIG. 5.

This also applies to the steering vector calculated by equation (11). Further, if this is applied to the covariance matrix, i.e. equation (12), it is understood that the lower-side N row and right-side N row are needless, from the calculation method of the covariance matrix (FIG. 6 shows a conceptual view). Specifically, the elements of 5 banks are extracted from the covariance matrix calculated with 6 banks, and the extracted elements are used in subsequent weight calculations. Thereby, the weight in the case of 5 banks can be calculated.

Figure 7:
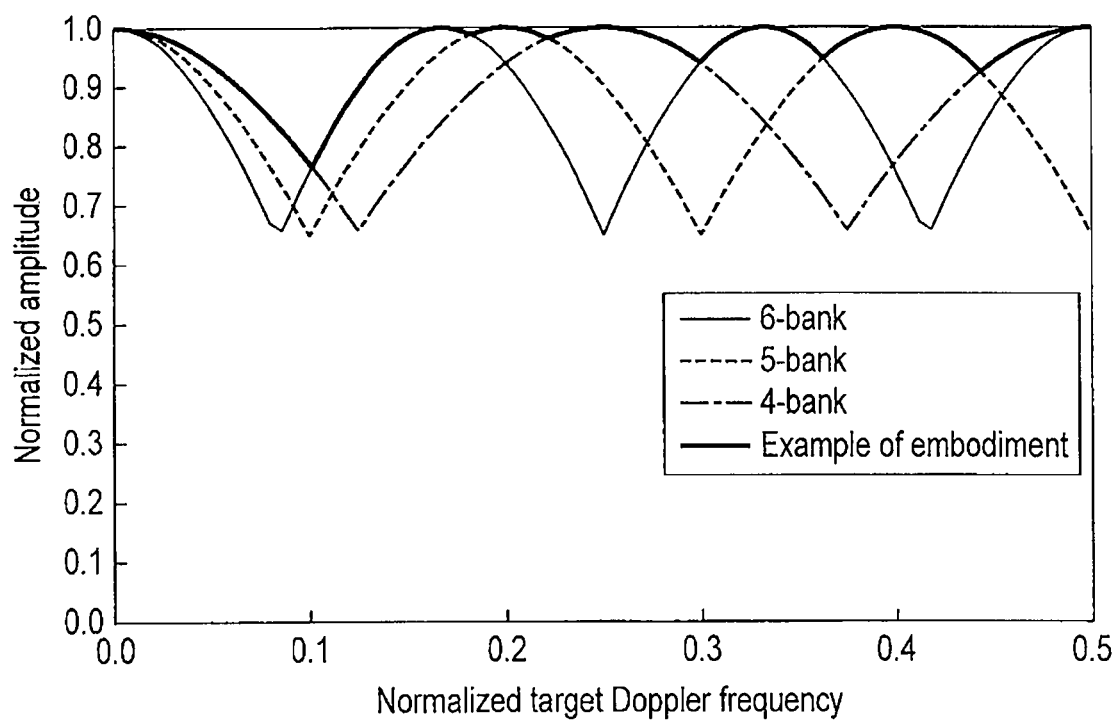
FIG. 7 is a characteristic graph showing the performance of an example in the embodiment.

The case of two successive banks has been described as an example of extraction of plural bank parts. However, it is possible to extract more than two successive banks (e.g. extraction of 6, 5 or 4 banks) or non-successive plural banks (e.g. extraction of 6, 4 and 3 banks). This may be determined, as described above, based on the relationship between the calculation time and signal process gain in accordance with the system. At this time, as shown in FIG. 7, when 6, 5 and 4 banks, for instance, are used for weight calculation, it is understood that the values of 0.09, 0.25 and 0.42, at which amplitudes relative to the target Doppler frequency were degraded with 6 banks alone, are improved.

In addition, as the extraction method of the covariance matrix, the case has been illustrated that the size of the matrix is decreased by extracting the relevant rows and columns and re-forming the covariance matrix. However, when 0 is filled in unnecessary elements (rows and columns) of the covariance matrix and steering vector, the same result can be obtained by normalization. However, the calculation amount becomes greater than in the above-described case.

Thus, according to the weight calculation method of the present embodiment, when the weight calculation is performed, the process of selecting the m banks after Doppler filter (Post-Doppler process) is applied to the M pulses of the reception signal, and the covariance matrix is calculated. The plural corresponding bank parts are extracted from the covariance matrix, based on the target Doppler frequency or the relationship between the calculation time and signal process gain, and a plurality of weights are calculated by the matrix of the extracted plural bank parts. Thereby, good SINR characteristics, relative to the target Doppler frequency, can be obtained.

Figure 8:
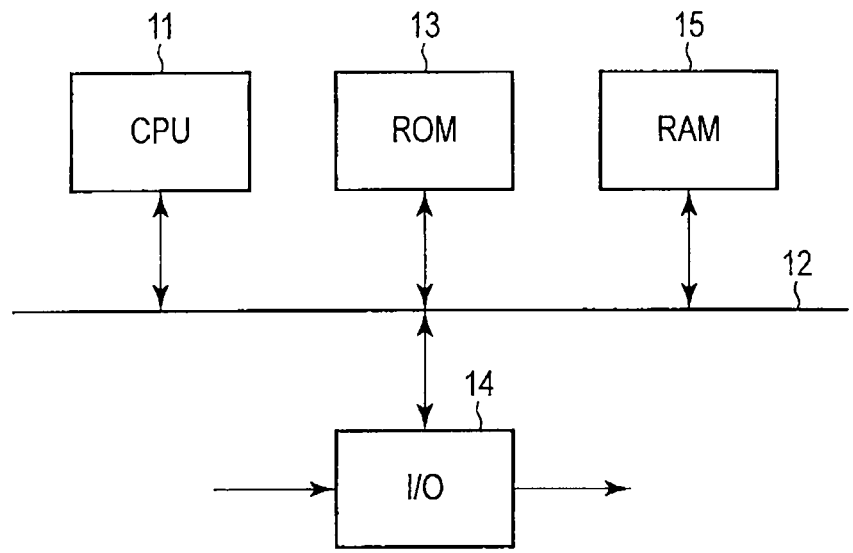
FIG. 8 is a block diagram illustrating an example of a weight calculation unit according to the embodiment.

FIG. 8 is a block diagram illustrating an example of a weight calculation unit according to the embodiment. In FIG. 8, numeral 11 denotes a CPU (Central Processing Unit). The CPU 11 is connected via a bus 12 to a ROM 13 for storing programs, a data input/output interface (I/O) 14, and a RAM 15 for temporarily storing data. In the ROM 13, a weight calculation program relating to the embodiment is stored. If a process start is instructed, the CPU 11 loads the program from the ROM 13, takes in data via the data input/output interface 14, temporarily stores the data in the RAM 15, reads out the data from the RAM 15 where necessary, executes a weight calculation process, and outputs the obtained weight arithmetic result from the interface 14.

The weight calculation unit of the embodiment with the above-described structure uses the above-described weight calculation method relating to the embodiment, which suppresses the degradation of SINR relative to the target Doppler frequency. Therefore, good SINR characteristics can be obtained.

This weight calculation unit is adopted in an adaptive array antenna, and is caused to execute calculations of weights for input/output of respective antenna elements. According to this, a synthetic beam with good SINR characteristics can be formed.

In the meantime, the adaptive array antenna is adopted in a radar apparatus such as a synthetic aperture radar for capturing a target. Since a synthetic beam having good SINR characteristics can be formed by adopting the weight calculation unit of the embodiment in the adaptive array antenna, as described above, a target can be captured more excellently in the radar apparatus using this antenna.

Figure 9:
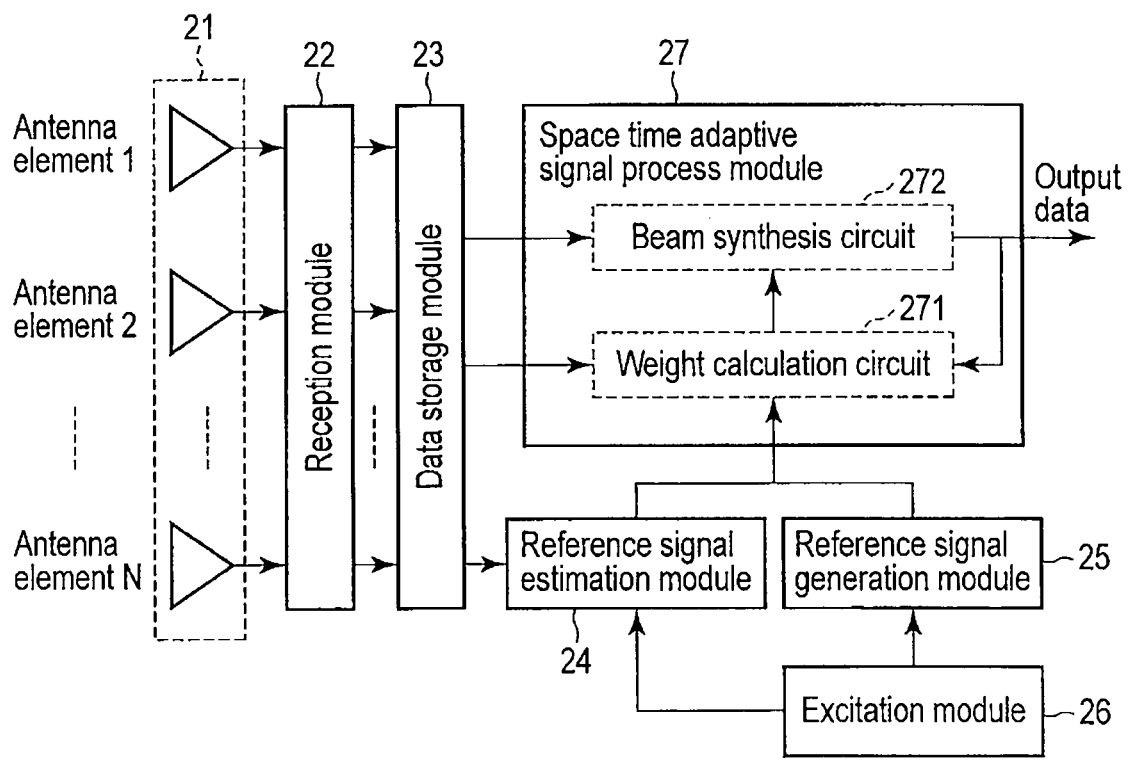
FIG. 9 is a schematic block configuration diagram of a radar apparatus in which the weight calculation unit in the space time adaptive processing relating to the embodiment and an adaptive array antenna are assembled.

FIG. 9 is a schematic block configuration diagram showing, as an example of the above-described radar apparatus, a radar apparatus in which the weight calculation unit in the space time adaptive processing, to which the embodiment is applied, is assembled. In FIG. 9, numeral 21 denotes an adaptive array antenna which receives a target reflective signal of a radar pulse by an N number of antenna elements. The outputs of the respective elements of the antenna 21 are received and detected by a reception module 22 and are sent to a data storage module 23. In the data storage module 23, memory areas, which correspond to process range cells with a length corresponding to a predetermined distance, are prepared in advance. The input data is successively stored in memory areas at corresponding cell positions according to the reception timing.

Outputs of some antenna elements are sent to a reference signal estimation module 24, and are used as a reference of amplitude/phase of a reception signal. An excitation module 26 periodically excites the reference signal estimation module 24 and reference signal generation module 25, thereby estimating and generating reference signals for weight calculation of range cells corresponding to the predetermined distance.

The data stored in the data storage module 23 is sent to a space time adaptive signal process module 27. The space time adaptive signal process module 27 calculates, in a weight calculation circuit 271, a covariance matrix from the data of range cells, which are obtained by excluding, from the stored data, range cells which estimated include a target signal, or in other words, from the data of range cells which are presumably formed of an undesired wave alone. At last, in a beam synthesis circuit 272, weight control is applied to the antenna reception signal by using an adaptive weight which has been calculated based on the covariance matrix, thus producing output data.

In the weight control in the space time adaptive signal processing method with the above configuration, the weight calculation for each range cell is executed in the weight calculation circuit 271, in order to calculate adaptive weights. The above-described weight calculation method is used in this weight calculation circuit 271. Specifically, a covariance matrix is calculated by applying a process (Post-Doppler process) of selecting m banks after execution of Doppler filtering to the M pulses of the received signal. The plural corresponding bank parts are extracted from the covariance matrix, based on the target Doppler frequency or the relationship between the calculation time and signal process gain, and a plurality of weights are calculated from the matrix of the extracted bank parts. Thereby, good SINR characteristics, relative to the target Doppler frequency, can be obtained.

Figure 10:
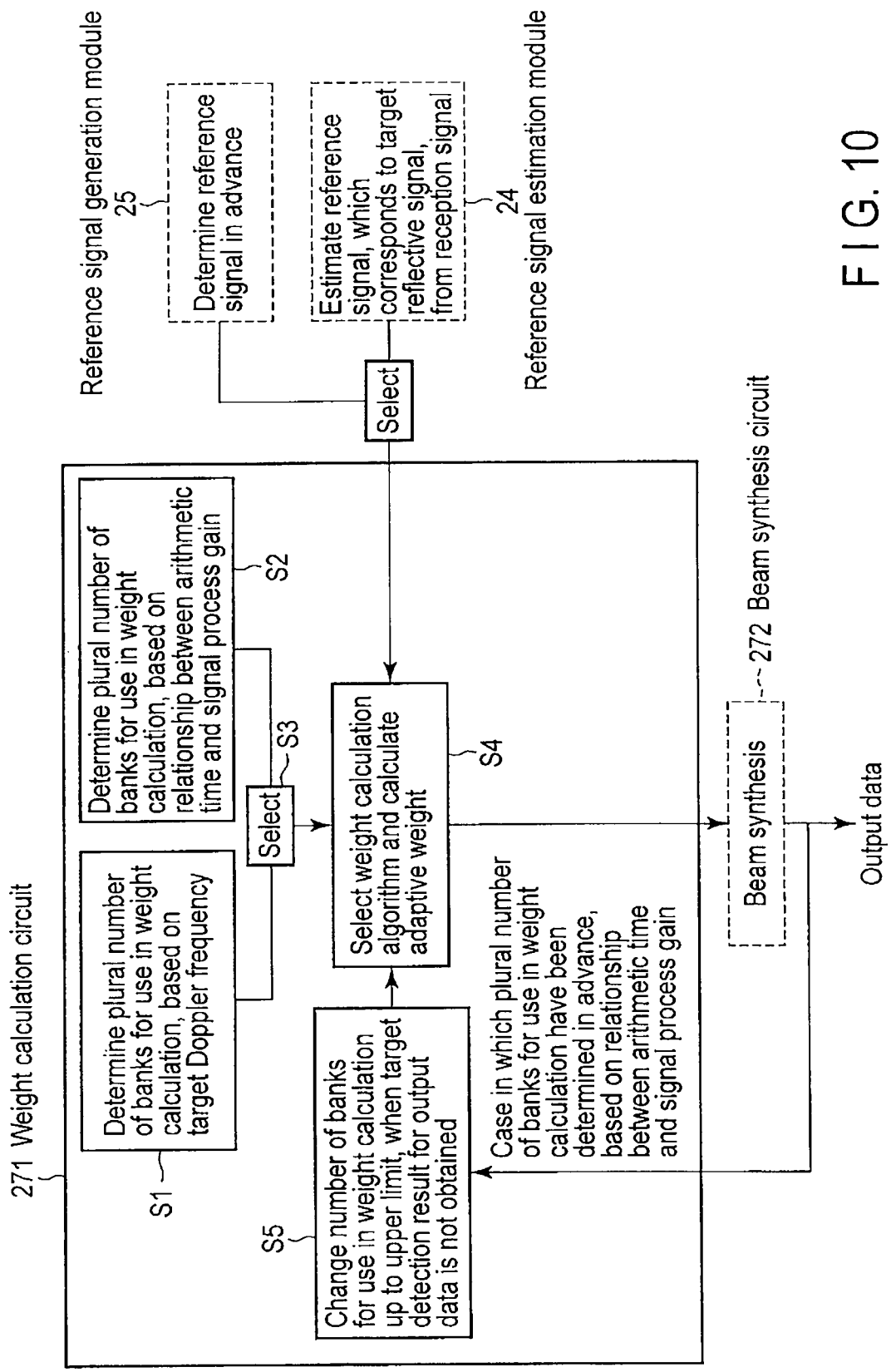
FIG. 10 is a flow chart illustrating the flow of a weight calculation process in the embodiment.

FIG. 10 illustrates a process flow to which the embodiment is applied. A plural number of banks, which are used for weight calculation, are determined from a target Doppler frequency (S1), or an upper limit and a lower limit are determined in advance from the relationship between the calculation time and signal process gain (S2). Which of these is to be applied is selected in advance (S3). Then, the weight calculation algorithm is selected in advance (S4). After the weight calculation, beam synthesis is performed in the beam synthesis circuit 272, and output data is obtained.

In the method of determining the upper limit and lower limit in advance from the relationship between the calculation time and signal process gain, when the target detection result for the output data cannot be obtained, the number of banks, which are used for weight calculation, is changed to the upper limit of the calculation time (S5). Then, the weight calculation and beam synthesis are executed once again, and output data is obtained. In addition, as regards the reference signal which is used for weight calculation, it is selectively determined in advance whether the reference signal is determined in advance in the reference signal generation module 25, or the reference signal corresponding to the target reflective signal is estimated from the reception signal in the reference signal estimation module 24, and the reference signal is used as a reference for selecting the algorithm (S4).

As has been described above, according to the present embodiment, in the space time adaptive signal processing method by the weight control, with respect to the covariance matrix which is calculated by applying the Post-Doppler process to the weight calculation for reducing to null the directivity in the direction of the undesired wave, a plurality of corresponding bank parts are extracted, based on the target Doppler frequency or the relationship between the calculation time and signal process gain, and a plurality of weights are calculated. Therefore, good SINR characteristics, relative to the target Doppler frequency, can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A weight calculation method comprising:
   storing a target reflective signal of a radar pulse, which is received via an antenna, at a corresponding cell position according to a reception timing on a plurality of process range cells with a length corresponding to a predetermined distance on a time axis; and
   calculating a weight on a phase and an amplitude of the received signal, for forming a reception synthesis beam in a manner to reduce directivity in an incoming direction of an undesired wave to null, relative to an incoming direction of the target reflective signal, with use of values stored in the plurality of process range cells,
   wherein the calculating of the weight includes:
   calculating a covariance matrix by applying a process (Post-Doppler process) of selecting a plurality of banks after execution of a Doppler filter process to a specified number of pulses of the received signal; and extracting a plurality of arbitrary bank parts from among the plurality of selected banks which are used for the calculation of the covariance matrix, and calculating a plurality of weights on the phase and the amplitude, from a matrix of the plurality of extracted bank parts.

2. The weight calculation method of claim 1, wherein the extraction of the plurality of arbitrary bank parts is executed based on a target Doppler frequency included in the target reflective signal.

3. The weight calculation method of claim 1, wherein the extraction of the plurality of arbitrary bank parts is executed based on a relationship between a calculation time and a signal process gain.

4. The weight calculation method of claim 1, wherein different algorithms are used for the calculation of the plurality of weights.

5. A weight calculation unit comprising:
a storage device configured to store a target reflective signal of a radar pulse, which is received via an antenna, at a corresponding cell position according to a reception timing on a plurality of process range cells with a length corresponding to a predetermined distance on a time axis; and
a calculation device configured to calculate a weight on a phase and an amplitude of the received signal, for forming a reception synthesis beam in a manner to reduce directivity in an incoming direction of an undesired wave to null, relative to an incoming direction of the target reflective signal, with use of values stored in the plurality of process range cells,
wherein the calculation device is configured to calculate a covariance matrix by applying a process (Post-Doppler process) of selecting a plurality of banks after execution of a Doppler filter process to a specified number of pulses of the received signal, to extract a plurality of arbitrary bank parts from among the plurality of selected banks which are used for the calculation of the covariance matrix, and to calculate a plurality of weights on the phase and the amplitude, from a matrix of the plurality of extracted bank parts.

6. The weight calculation unit of claim 5, wherein the calculation device is configured to execute the extraction of the plurality of arbitrary bank parts, based on a target Doppler frequency included in the target reflective signal.

7. The weight calculation unit of claim 5, wherein the calculation device is configured to execute the extraction of the plurality of arbitrary bank parts, based on a relationship between a calculation time and a signal process gain.

8. The weight calculation unit of claim 5, wherein the calculation device is configured to use different algorithms for the calculation of the plurality of weights.

9. The weight calculation unit of claim 5, wherein the calculation device is configured to use a reference signal or an estimated reference signal, which corresponds to the target reflective signal, for the calculation of the plurality of weights.

10. An adaptive array antenna configured such that a plurality of element antennas are arranged in an array and directivity is controlled in an arbitrary direction, thereby to receive a target reflective signal of a radar pulse, comprising:
a storage device configured to store the target reflective signal at a corresponding cell position according to a reception timing on a plurality of process range cells with a length corresponding to a predetermined distance on a time axis;
a calculation device configured to calculate a weight on a phase and an amplitude of the received signal, for forming a reception synthesis beam in a manner to reduce directivity in an incoming direction of an undesired wave to null, relative to an incoming direction of the target reflective signal, with use of values stored in the plurality of process range cells; and
a beam forming device configured to form a reception synthesis beam by executing weight control on the target reflective signal by the calculated weight,
wherein the calculation device is configured to calculate a covariance matrix by applying a process (Post-Doppler process) of selecting a plurality of banks after execution of a Doppler filter process to a specified number of pulses of the received signal, to extract a plurality of arbitrary bank parts from among the plurality of selected banks which are used for the calculation of the covariance matrix, and to calculate a plurality of weights on the phase and the amplitude, from a matrix of the plurality of extracted bank parts.

11. The adaptive array antenna of claim 10, wherein the calculation device is configured to execute the extraction of the plurality of arbitrary bank parts, based on a target Doppler frequency included in the target reflective signal.

12. The adaptive array antenna of claim 10, wherein the calculation device is configured to execute the extraction of the plurality of arbitrary bank parts, based on a relationship between a calculation time and a signal process gain.

13. The adaptive array antenna of claim 10, wherein the calculation device is configured to use different algorithms for the calculation of the plurality of weights.

14. The adaptive array antenna of claim 10, wherein the calculation device is configured to use a reference signal or an estimated reference signal, which corresponds to the target reflective signal, for the calculation of the plurality of weights.

15. A radar apparatus comprising:
an adaptive array antenna configured such that a plurality of element antennas are arranged in an array and directivity is controlled in an arbitrary direction, thereby to receive a target reflective signal of a radar pulse, the adaptive array antenna being configured to form a reception synthesis beam by executing weight control on the target reflective signal by a given adaptive weight;
a weight calculation device configured to store the target reflective signal at a corresponding cell position according to a reception timing on a plurality of process range cells with a length corresponding to a predetermined distance on a time axis, and to calculate a weight on a phase and an amplitude of the received signal, for forming a reception synthesis beam in a manner to reduce directivity in an incoming direction of an undesired wave to null, relative to an incoming direction of the target reflective signal, with use of values stored in the plurality of process range cells; and
a signal process device configured to detect a target from the target reflective signal which has been subjected to the weight control in the adaptive array antenna,
wherein the weight calculation device is configured to calculate a covariance matrix by applying a process (Post-Doppler process) of selecting a plurality of banks after execution of a Doppler filter process to a specified number of pulses of the received signal, to extract a plurality of arbitrary bank parts from among the plurality of selected banks which are used for the calculation of the covariance matrix, and to calculate a plurality of weights on the phase and the amplitude, from a matrix of the plurality of extracted bank parts.

16. The radar apparatus of claim 15, wherein the weight calculation device is configured to execute the extraction of the plurality of arbitrary bank parts, based on a target Doppler frequency included in the target reflective signal.

17. The radar apparatus of claim 15, wherein the weight calculation device is configured to execute the extraction of the plurality of arbitrary bank parts, based on a relationship between a calculation time and a signal process gain.

18. The radar apparatus of claim 15, wherein the signal process device is configured to detect a shape of a target.

19. The radar apparatus of claim 15, wherein the weight calculation device is configured to use different algorithms for the calculation of the plurality of weights.

20. The radar apparatus of claim 15, wherein the weight calculation device is configured to use a reference signal or an estimated reference signal, which corresponds to the target reflective signal, for the calculation of the plurality of weights.

\* \* \* \* \*